United States Patent [19]

Greer et al.

[11] Patent Number: 4,745,939
[45] Date of Patent: May 24, 1988

[54] SHOCK ACTUATED SHUT-OFF VALVE WITH GASTIGHT RESET SYSTEM

[75] Inventors: Charles W. Greer, San Carlos; Andrew F. Asbra, Rancho Mirage, both of Calif.; Martin R. Asbra, 2475 Butternut Dr., Hillsborough, Calif. 94010

[73] Assignees: Andrene Associates; Martin R. Asbra, both of Burlingame, Calif. ; a part interest

[21] Appl. No.: 47,174

[22] Filed: May 7, 1987

[51] Int. Cl.[4] ............................................. F16K 17/36
[52] U.S. Cl. ...................................... 137/38; 137/613
[58] Field of Search ............................ 137/38, 39, 613

[56] References Cited

U.S. PATENT DOCUMENTS 4,116,209  9/1978  Greer ..................................... 137/38
4,207,912  6/1980  Ichikawa ............................... 137/39

Primary Examiner—Robert G. Nilson
Attorney, Agent, or Firm—Donald Diamond

[57] ABSTRACT

A shock actuated shut-off valve for fluid flow lines is provided which includes a valve housing having a central chamber in communication with inlet and outlet conduits and with a hollow, outwardly enclosed stowage arm in upward, substantially plumb communication with the central chamber. A valve element having a longitudinal aperture incorporating non-occlusive abutment means is releasably supported in the stowage arm for vibratory displacement to and sealing engagement with the central chamber. An inner closure is sealingly disposed in the stowage arm above the valve element. A tether slidably and sealingly extends through an aperture in the inner closure and extends, in spaced relationship, through the aperture in the releasably supported valve element, with the lower end of the tether incorporating a lift member disposed, in a non-obstructive static position, below the abutment means. Following displacement of the valve element to the central chamber, reset is effected by the sequential application of upward and downward force to the tether whereby the valve element, upon being engaged by the lift member, is lifted upwardly to a stop position and thereafter descends to its releasably supported position with the lift member descending to its static position.

20 Claims, 5 Drawing Sheets

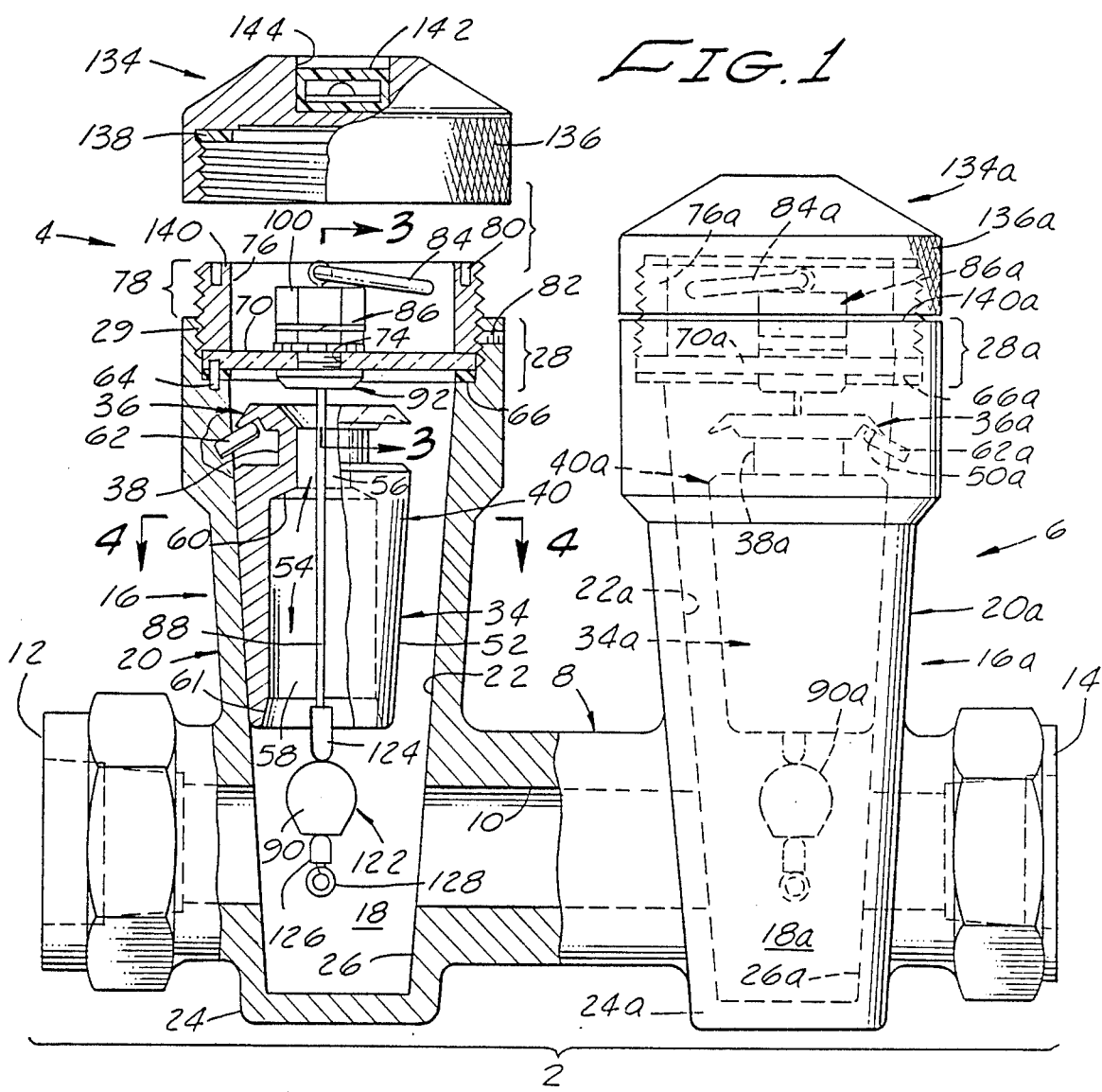
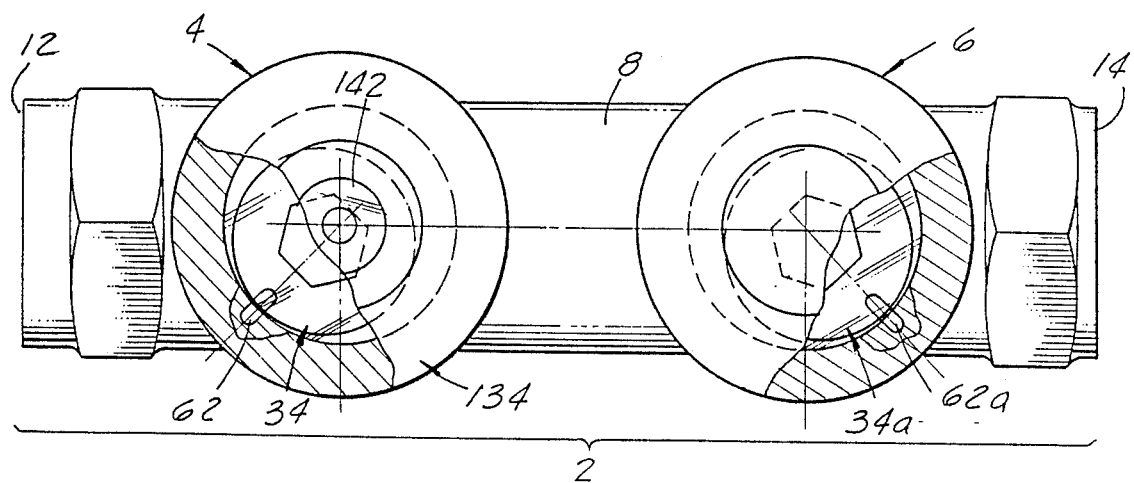

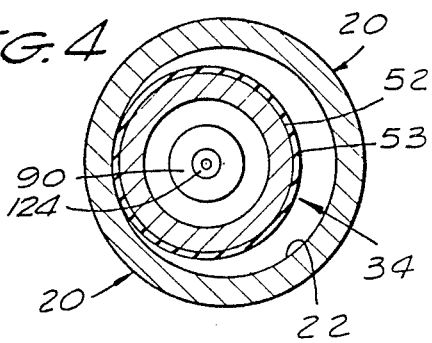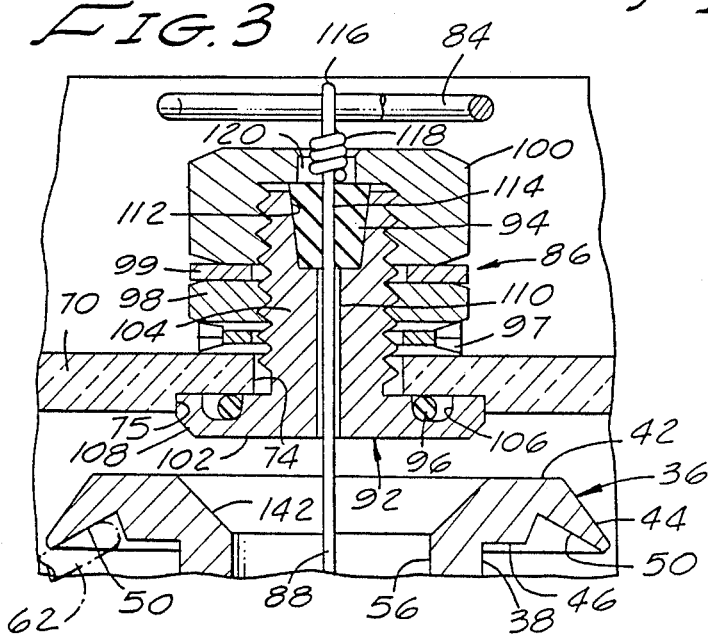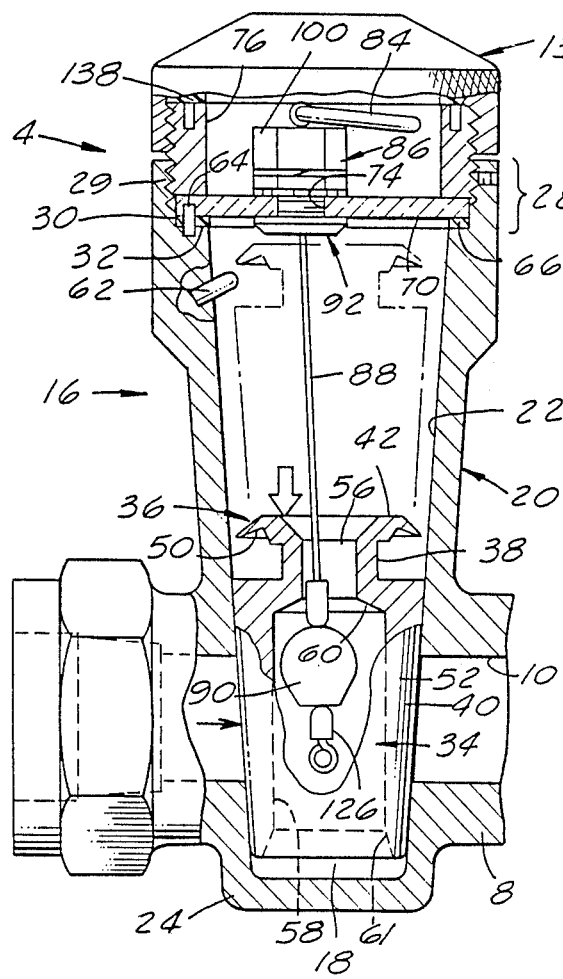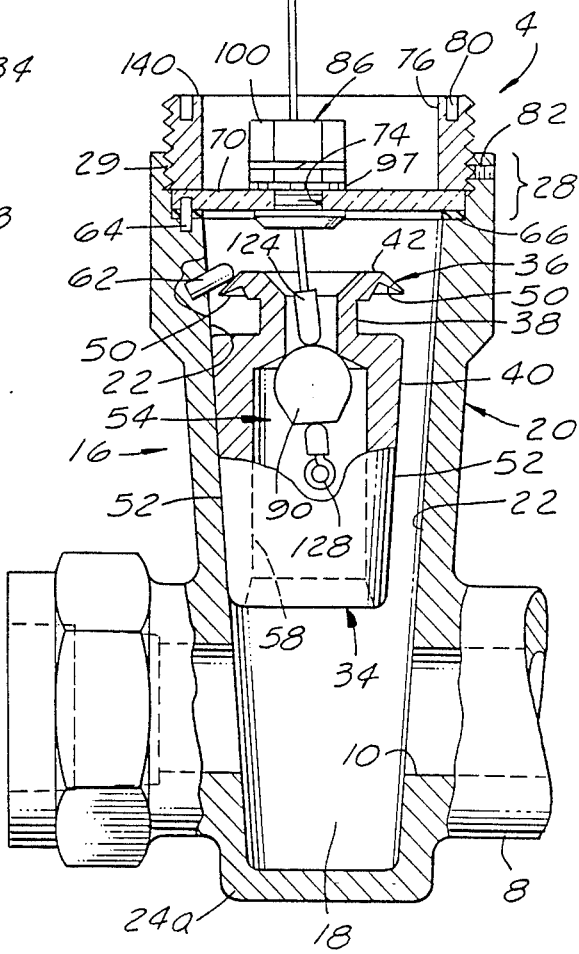

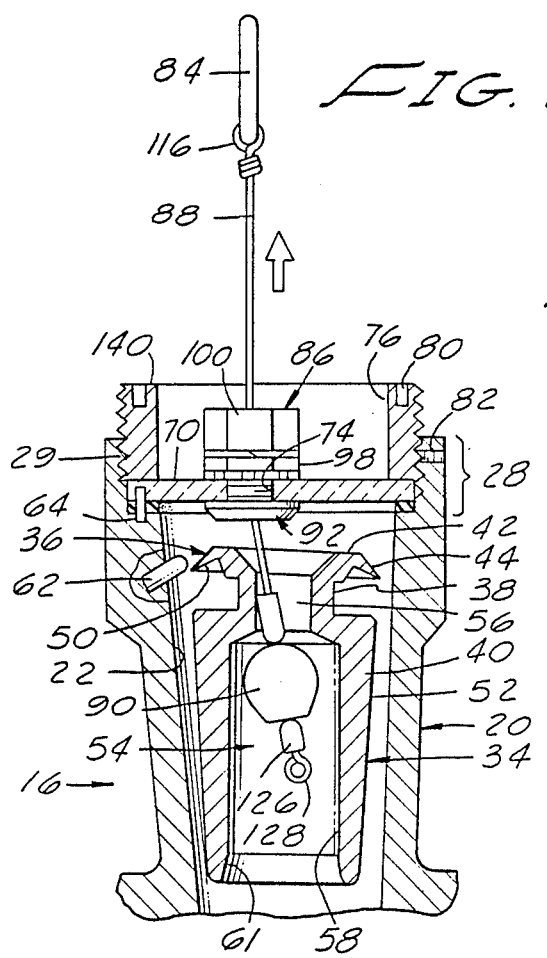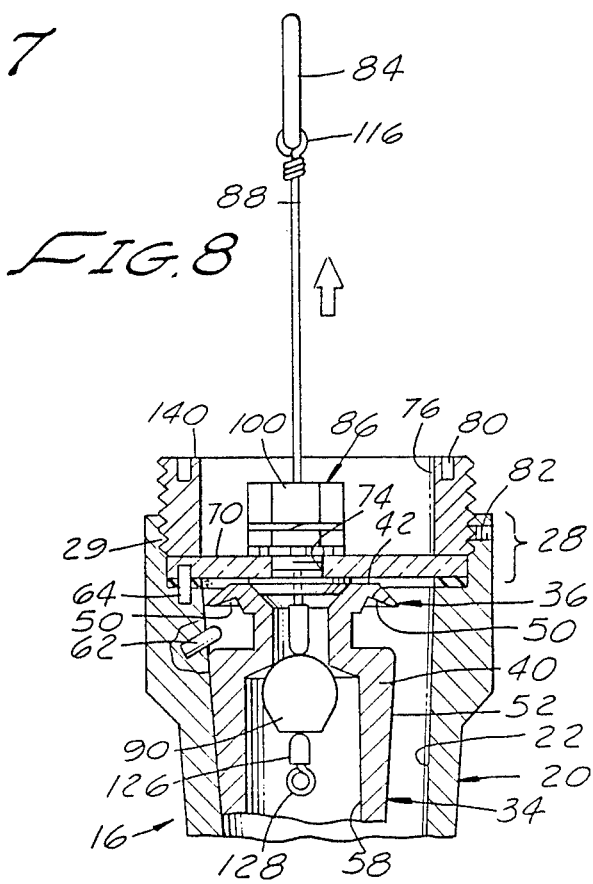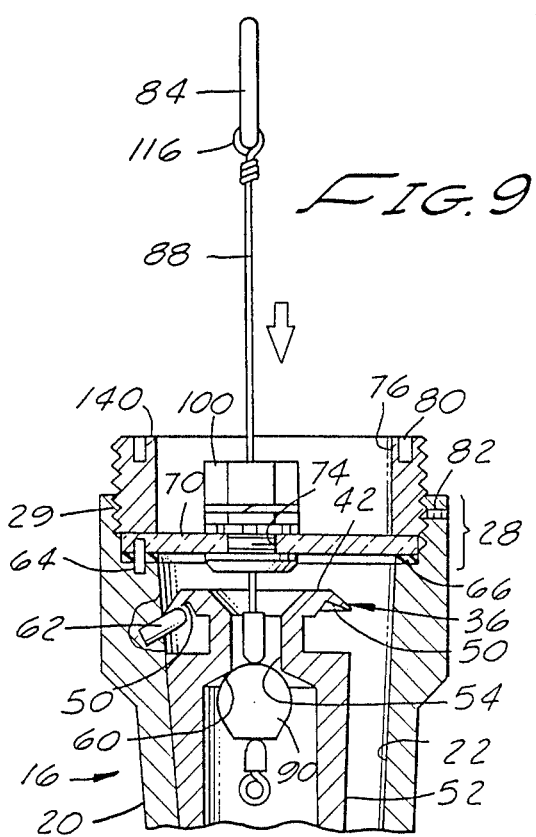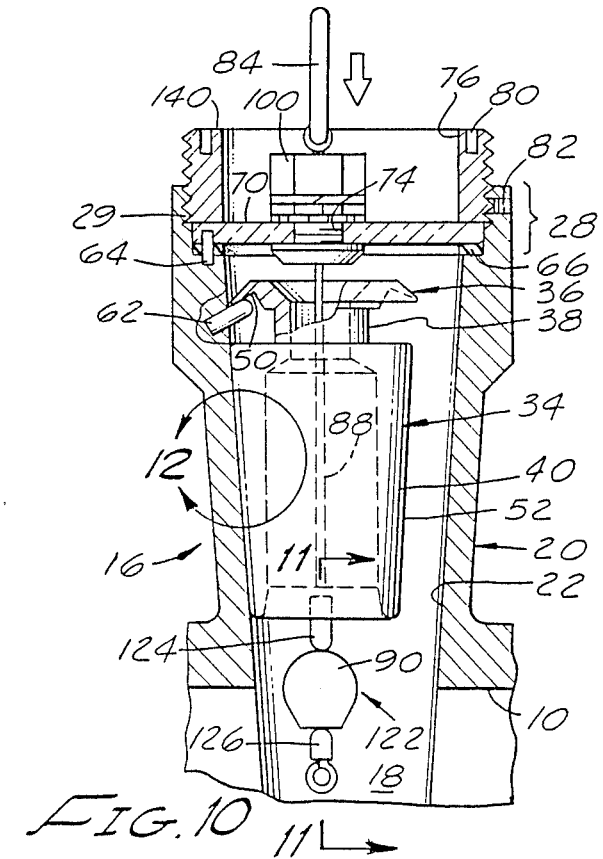

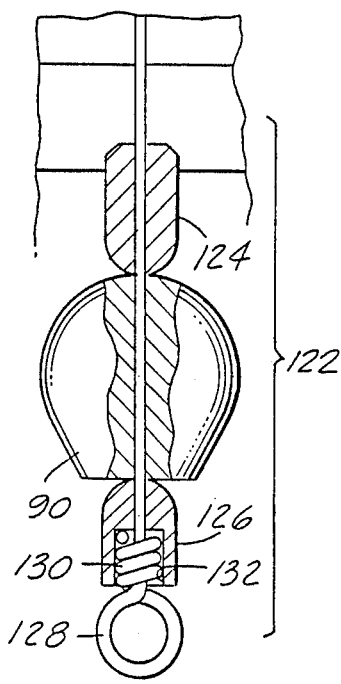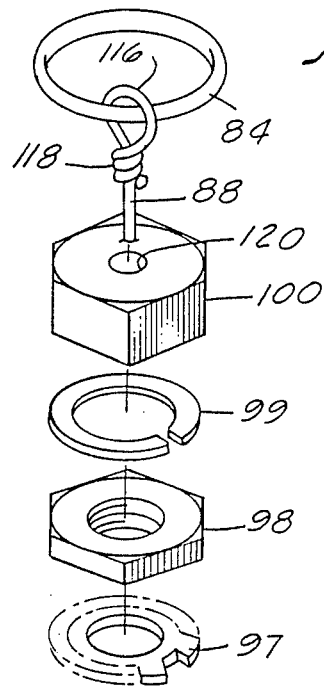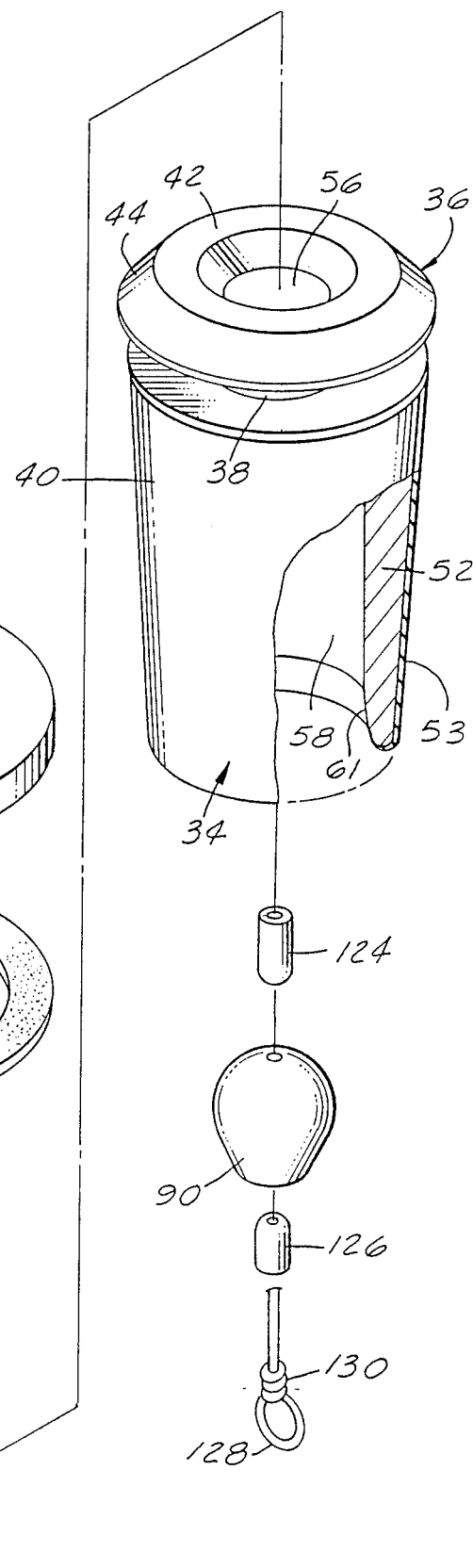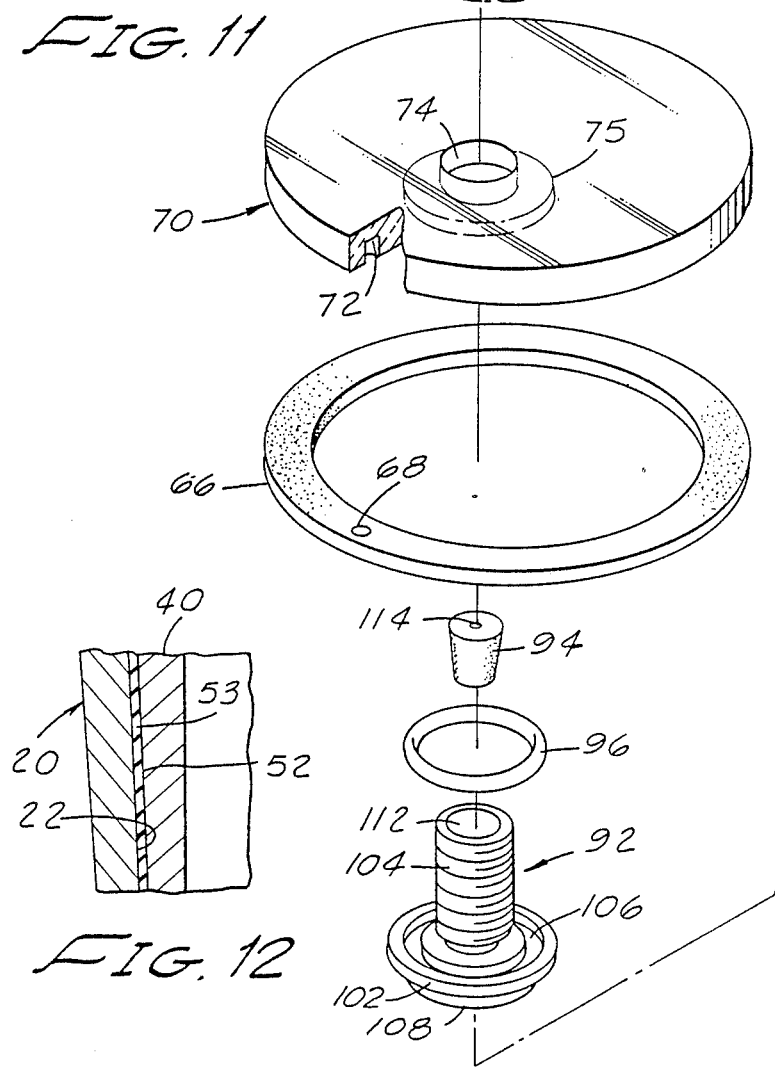

FIG. 14
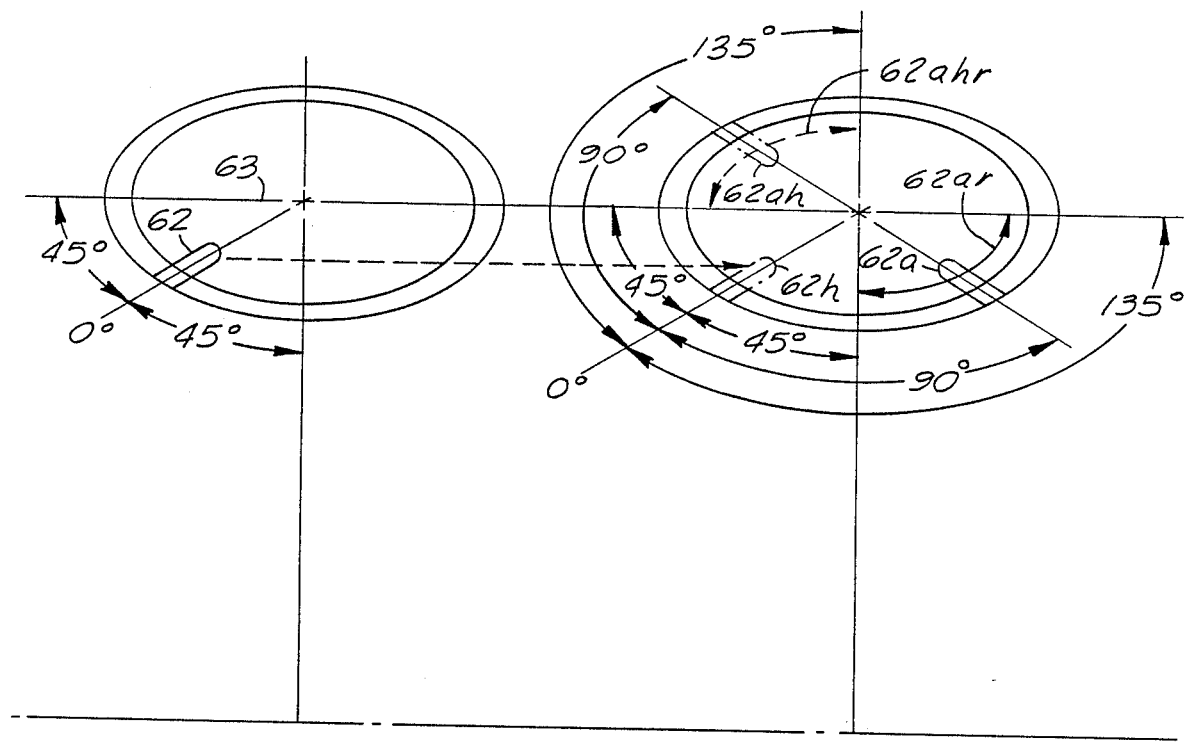
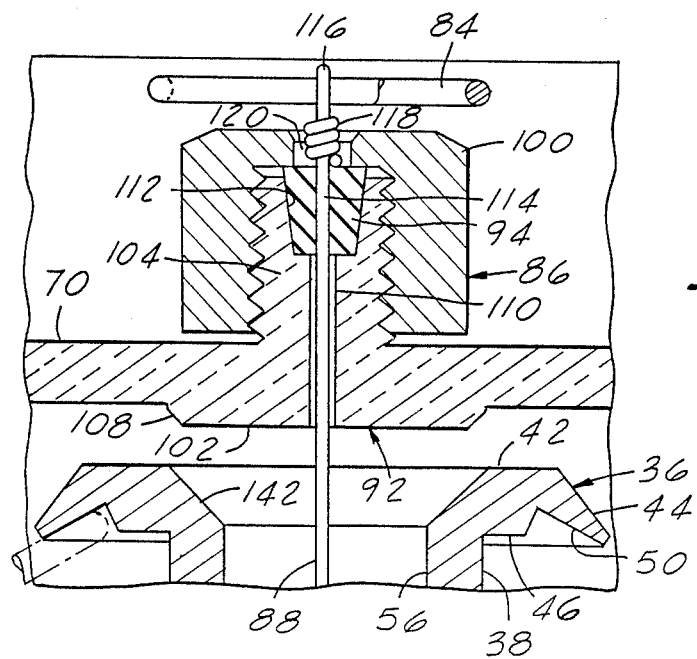
FIG. 3A

SHOCK ACTUATED SHUT-OFF VALVE WITH GASTIGHT RESET SYSTEM

BACKGROUND OF THE INVENTION

1. Field of the Invention

This invention relates to shock actuated shut-off valves for fluid flow conduits and, more particularly, to a gastight reset system for such valves. In another aspect, this invention relates to the linear duplicate deployment of such valves wherein the internal orientation of one valve with respect to the internal orientation of the other valve is such that the valve system is actuatable over the broad potential direction of vibratory forces.

Although the shut-off valves described herein are particularly well adapted for closing natural gas lines in response to vibratory forces arising from seismic disturbances, their use is not so limited and they may be used to interrupt flow in lines carrying different kinds of gases and fluids under wide ranges of temperature and pressure in response to shock actuation from diverse sources.

In an earthquake or seismic disturbance of any significant magnitude, substantial vibratory forces are generated which can damage and rupture feeder lines used to deliver natural gas into residential, commercial and public structures. As a result, natural gas can leak or flow from such damaged or ruptured lines and accumulate in and about the aforesaid structures. The accumulated natural gas can form an explosive mixture with the surrounding area and be detonated by an appliance pilot light, other fire source or a spark. The fire and explosion hazard from damaged or broken gas lines following an earthquake is well known and constitutes a significant threat to persons and property.

A number of shock actuated, gas shut-off valves have been disclosed in the prior art to meet the fire and explosion hazard posed by earthquake damage to gas feeder lines. These prior art disclosures include U.S. Pat. No. 2,585,316 (Hobson, 1952); U.S. Pat. No. 2,927,592 (Ferre, 1960); U.S. Pat. No. 3,747,616 (Lloyd, 1973); U.S. Pat. No. 3,768,497 (Mueller, 1973); and U.S. Pat. No. 4,116,209 (Greer, 1978).

2. Prior Art

U.S. Pat. No. 4,116,209 discloses a shock actuated shut-off valve for fluid flow lines comprising: (i) a valve housing provided with a central chamber in communication with (a) a hollow inlet conduit, (b) a hollow outlet conduit, and (c) a hollow stowage arm in upward, substantially plumb communication with the central chamber, with the stowage arm being provided with closure means at its outer end; (ii) a valve element disposed in the stowage arm and having a valve body and valve head interconnected by a valve neck with the valve head being distal to the central chamber; (iii) a valve element support member secured to the inner wall of the stowage arm, with the valve head being in engagement with and releasably supported by the support member; and (iv) wherein the valve element is in spaced relationship to the surrounding inner wall of the stowage arm to thereby permit lateral displacement of the valve element from the support member and vertical transition of the valve element to the central chamber for sealingly engaging that chamber with respect to at least one of the inlet and outlet conduits.

In the prior art valve described in U.S. Pat. No. 4,116,209, the upper surface of the valve head is provided with a recess and a reset loop is mounted in the recess. Also, the lower portion of the housing, opposite the stowage arm, is distended to provide a lower level continuation of the central chamber. A threaded aperture traverses the distended portion of the housing and is sealingly engaged by a removable threaded plug. Reset is manually effected by removing the enclosure from the stowage arm and engaging the retrieval loop in the valve head with a suitably bent wire. The retrieved valve element is then manually returned to its releasably supported position in the stowage arm, and the closure re-assembled to the stowage arm. In the event that the valve element becomes tightly wedged in the closed position, the bottom plug can be removed and the valve element tapped out of its wedged position with a suitable instrument.

The aforesaid reset system, which requires the removal of the external closure from the stowage arm in order to gain access to the retrieval loop in the head of the valve element, exposes the inlet conduit and the central chamber to the surrounding environment which could present a hazard through the release of any gas to such environment.

SUMMARY OF THE INVENTION

Accordingly, an important object of this invention is to provide a gastight reset system for shock actuated shut-off valves adapted for use in fluid flow lines.

Another object of this invention is to provide a shock actuated shut-off valve system that is actuatable over the broad potential direction of vibratory forces.

The term, "plumb", as used herein refers to the vertically disposed, upward/downward direction.

The improvements of this invention are particularly adapted for use with the shock actuated shut-off valves described in U.S. Pat. No. 4,116,209 and like valves.

The valve assembly of this invention comprises a valve housing having a central chamber in communication with hollow inlet and outlet conduits and with a hollow stowage arm in upward, substantially plumb communication with the central chamber.

A valve element, which includes a valve head and a valve body interconnected by a valve neck is disposed in the stowage arm with the valve head being distal to the central chamber. The underside of the valve head is in engagement with and releasably supported by a support member secured to the inner wall of the stowage arm. The valve element is in spaced relationship to the portion of the inner wall that extends outwardly from the support member to provide valve element clearance between the support member and inner wall whereby lateral dislodgment of the valve head from the support member effects transition of the valve element through the stowage arm into the central chamber with the valve body sealingly engaging the chamber with respect to at least one of the inlet and outlet conduits.

A vertically disposed valve element aperture, which incorporates non-occlusive abutment means, extends through the valve element. The valve element aperture advantageously comprises an upper portion and a lower portion wherein the cross-sectional area of the upper portion is less than the cross-sectional area of the lower portion, and the non-occlusive abutment means is defined by the confluence of the upper and lower portions.

The valve body tapers inwardly in the downward direction and the inner wall of the stowage arm is provided with a substantially corresponding taper so as to facilitate transition of the valve element through the stowage arm and to provide a sealingly disposed seat in and about the central chamber for the valve body.

An inner closure is disposed in the stowage arm at a locus above the valve element. Means are provided for sealingly securing the periphery of the inner closure about the inner wall of the stowage arm at this locus which advantageously include an assembly comprising (i) a tubular recess in the upper end section of the inner wall of the stowage arm with the lower end of the recess defining a shoulder portion (ii) sealing means engaging the shoulder portion, (iii) the inner closure engaging the sealing means, and (iv) tubular compressor means engaging the inner closure with the tubular compressor means being adjustably and releasably secured to the tubular recess in the upper end section of the stowage arm. The inner closure can be constructed from high strength polymeric material as, for example, Lexan polycarbonate resin so as to provide a transparent closure for observing the disposition of the valve element in the stowage arm.

A vertically disposed, inner closure aperture extends through the inner closure and is positioned so as to be in superimposed alignment with the valve element aperture. The inner closure aperture advantageously comprises adjustable sealing means as, for example, a longitudinally apertured adjustable compression fitting in the form of a packing gland incorporating a longitudinally apertured, sealingly adjustable packing gland seal.

A tether extends through the inner closure aperture and through the valve element aperture. The tether, which is in sealingly slidable relationship with the inner closure aperture, or the inner closure aperture accoutrement, and in spaced relationship to the valve element aperture, has upper and lower end sections, with the upper end section incorporating handle means disposed proximate to the upper surface of the inner closure and the lower end section incorporating a lift member disposed, in a static position, in the housing below the abutment means. The lift member is in traversable alignment with the valve element aperture and in spaced relationship to the valve element abutment means to permit transition of the valve element to the central chamber and to permit the lift member to liftingly engage the abutment means for returning the valve element to its releasably supported position. The application of upward force to the handle means, when the valve element is sealingly disposed in the central chamber, causes the lift member to engage the abutment means and transport the valve element upwardly to a stop position at the underside of the inner closure, with the valve head, during the upward transition of the valve element, engaging and deflecting about the support member to effect seating alignment of the valve head with the support member. The subsequent application of downward force to the handle means initially causes the valve element to descend to its releasably supported position, with the valve head engaging the support member, and thereafter causes the lift member to disengage from the abutment means and descend to its static position. The tether utilized in the reset system described herein is, advantageously, constructed from spring wire.

To facilitate alignment of the operational components, a vertically disposed locater pin is secured to the shoulder portion of the stowage arm, a locater aperture traverses the sealing means that engage the shoulder portion, and a locater pin recess is disposed in the inner closure, whereby the locater pin passes through the locater aperture and seats in the locater pin recess to provide horizontal positioning for the inner closure aperture, the tether and the lift member to thereby provide effective horizontal alignment of the valve element for return to its releasably supported position, following displacement of the valve element to the central chamber, wherein the valve head slidingly contacts and deflects about the support member for placing the valve head in appropriate alignment for reseating on the support member.

Removable closure means are provided for enclosing the outer periphery of the stowage arm.

In a further embodiment, the shock actuated shut-off valve described herein is deployed in a linearly aligned dual system wherein the angular alignment of the valve element support member in one valve assembly with respect to the valve element support member in the other valve assembly is out of phase at about 90°±45°, right or left, based on a hypothetical transition of the location of the support member in one valve assembly to a corresponding location in the other valve assembly. Thus, the hypothetical angular alignment of the support member in one valve assembly with respect to the support member in the other valve assembly is from about 45° to about 135°, with about 90° being preferred for optimum actuating efficiency. Also, in the preferred mode, one of the support members is disposed at an angular alignment of about 45° from the longitudinal axis of the linearly aligned system. This non-alignment of the support members in the dual valves permits the valve system to sealingly respond to vibratory forces over a broad directional range including vibratory forces in line with one of the valve element support members.

DESCRIPTION OF THE DRAWINGS

FIG. 1 is a schematic sectional view of the linearly aligned dual valve system of the present invention showing, for each valve assembly, the valve element and reset mechanism in the pre-actuated position.

FIG. 2 is a schematic top plan view of the dual valve system wherein portions of the structure have been excised to show, in each valve assembly, the valve element support member disposed therein and the non-aligned angular relationship between the support members.

FIG. 3 is an exploded, fragmentary, sectional view taken along line 3—3 of FIG. 1 and shows the packing gland assembly disposed in and about the aperture in the inner closure, and further shows the reset tether extending sequentially downward through the apertures of the packing gland seal and packing gland body, respectively, in the packing gland assembly with the outer end of the tether incorporating a handle.

FIG. 3A is a view similar to FIG. 3, but shows the inner closure and packing gland body as an integral unit.

FIG. 4 is a transverse section taken along line 4—4 of FIG. 1 and shows the space relationship between the valve element and the inner wall of the stowage arm when the valve element is in the pre-actuated position.

FIG. 5 is a partial schematic view showing vibratory displacement of the valve element from the valve element support pin and transition of the valve element to the central chamber.

FIGS. 6 through 10 are partial schematic views showing the transitional steps in returning the valve element from its sealing position to its pre-actuated position. FIG. 6 shows that the application of upward force to the tether causes the lift member to engage the valve element aperture abutment and bring the sealingly disposed valve element to a position where the sidewall of the valve head engages the underside of the valve element support member. FIG. 7 shows that the continued application of upward force to the tether causes the valve head to deflect about the valve element support member; FIG. 8 shows that the further application of upward force to the tether brings the valve head into re-seating alignment with the support pin, with the top surface of the valve head being in engagement with the lower surface of the inner closure, and also shows the upper end of the valve element aperture and the lower end of the packing gland body being provided with substantially corresponding tapers for mating engagement; FIG. 9 shows that the application of downward force to the tether brings the valve head into re-seating engagement with the valve element support member; and FIG. 10 shows that the continued application of downward force to the tether returns the lift member to its static position.

FIG. 11 is an exploded, fragmentary, sectional view taken along line 11—11 of FIG. 10 and shows the lift member secured to the lower end of the tether by oppositely disposed swaged retainer bushings.

FIG. 12 is an exploded, fragmentary, sectional view taken at circumferential line 12 of FIG. 10 and schematically shows the polymeric coating on the outer surface of the valve body.

FIG. 13 is a partially fragmented, perspective and exploded view of the reset mechanism in disengaged format.

FIG. 14 is a hypothetical and schematic plan view developed from FIG. 2 and which shows the first and second valve element support members of the dual valve system out of phase at about 90°±45°, right or left, based on a hypothetical transition of the location of the support member in one valve assembly to a corresponding location in the other valve assembly.

DETAILED DESCRIPTION

Referring now to the drawings and, in particular, to FIG. 1, there is shown a shock actuated, linearly aligned, dual valve shut-off system 2 for fluid flow lines which includes first and second, vertically disposed, valve assemblies 4, 6 in fluid flow communication with a horizontally disposed, linear conduit 8 having a bore 10 and inlet and outlet orfices 12, 14.

Except for the deployment of the valve support members in the first and second valve assemblies as will hereinafter be described, the components and construction of the valve assemblies are substantially the same and will be particularly described in respect of the first valve assembly, with like referenced numerals, incorporating a letter addition, being used to indicate corresponding components in the second valve assembly.

The first valve assembly 4 includes a valve housing 16 having a central chamber 18 in substantially horizontal communication with the bore 10 of the linear conduit 8 and in upward substantially plumb communication with a hollow stowage arm 20. The inner wall 22 of the stowage arm has a substantially cylindrical configuration in transverse section (FIG. 4) and tapers inwardly in the downward, plumb direction. The lower portion 24 of the valve housing, opposite the stowage arm, is distended to provide a lower level continuation of the central chamber. The taper of the stowage arm inner wall 22 is continued through the central chamber to the inner side wall 26 of the distended portion of the housing. The upper end section 28 of the stowage arm inner wall 22 is provided with a vertically disposed, threaded, tubular recess 29 which culminates at its lower end in substantially smooth vertical 30 and horizontal 32 surfaces (FIG. 5).

A valve element 34 is disposed in the stowage arm 20 at a releasably supported position and in spaced relationship to the stowage arm inner wall 22 to provide dislodgable valve element clearance between the supported position and the inner wall. The valve element includes a valve head 36, a valve neck 38 and an elongated valve body 40, with the valve head being distal to the central chamber. The valve head is defined by an upper surface 42, a depending side wall 44 and a lower surface 46, with the depending side wall being inwardly inclined from the lower surface to the upper surface, and an angular recess 50 is disposed in the lower surface of the valve head, near its outer end (FIG. 3). The outer side wall 52 of the elongated valve body has a substantially cylindrical configuration in transverse section (FIG. 4) and has an inward taper in the downward, plumb direction that substantially corresponds to the taper of the inner wall 22 of the stowage arm.

The outer side wall 52 of the valve body 40 is advantageously coated with a plastic composition which forms a suitable plastic skin 53, such as Teflon coating, in order to enhance the operational and sealing characteristics of the valve element 34 (FIGS. 4 and 12).

A vertically disposed valve element aperture 54 extends through the valve element. The valve element aperture includes an upper portion 56 and a lower portion 58 wherein the cross-sectional area of the upper portion is less than the cross-sectional area of the lower portion, with the confluence of the upper and lower portions defining a tapered abutment 60 for use in returning an actuated valve element to its pre-actuated position (FIG. 5) as will hereinafter be more fully described. Also, the lower end 61 of the side wall defining the valve element lower aperture 58 is flared outwardly to facilitate the resetting of the actuated valve.

A first support member 62, for releasably maintaining the valve element 34 in the stowage arm 20 of the first valve assembly 4, is secured to the stowage arm inner wall 22 at a locus below its upper end section 28. The first support member 62 is inclined upwardly at a moderately steep angle with its outer end being in releasable engagement with the angular recess 50 in the lower surface 46 of the valve head 36 whereby the valve element 34 is releasably and eccentrically disposed in the stowage arm 20 in spaced relationship to the inner wall 22, as shown in FIG. 4.

A second support member 62a, for releasably maintaining the valve element 34a in the stowage arm 20a of the second valve assembly 6, is secured to the stowage arm inner wall 22a at a locus below its upper end section 28a. The second support member 62a, like the first support member 62, is inclined upwardly at a moderately steep angle with its outer end being in releasable engagement with the angular recess 50a in the lower surface of the valve head 36a whereby the valve element 34a is releasably and eccentrically disposed in the stowage arm 20a in spaced relationship to the inner wall 22a in a manner analogous to that shown in FIG. 4.

As shown in FIG. 14, the angular alignment of the first support member 62 with respect to the second support member 62a or 62ah, is out of phase at about 90°±45°, right or left, based on a hypothetical transition of the location of support member 62 in the first valve assembly 4 to a corresponding hypothetical location 62h in the second valve assembly 6. The angular, out of phase range for the second support member 62a is illustrated by range line 62ar and the angular out of phase range for the second support member alternative location 62ah is illustrated by range line 62ahr. Thus, the hypothetical angular alignment of the first support member 62 with respect to the second support member is from about 45° to about 135°. In a preferred embodiment, the angular alignment of one support member as, for example, the first support member 62 with respect to the longitudinal axis 63 of the linearly aligned system is about 45° and the angular alignment between the first and second support members, to the right 62h-62a or to the left 62h-62ah, is about 90°. For enhanced efficiency, neither the support member 62 in the first valve assembly 4 nor the support member (right 62a or left 62ah) in the second valve assembly 6 should be disposed in alignment with the longitudinal axis of the linear conduit 8. This non-alignment of the support members in the dual valves permits the valve system to sealingly respond to vibratory forces over a broad directional range including vibratory forces in line with one of the valve element support members.

Referring now to the reset system and to FIGS. 1 and 13, a locater pin 64 is secured to and extends upwardly from the horizontal surface 32 of the inner wall recess 28. A sealing gasket 66, which is provided with a locater pin aperture 68, overlies the horizontal surface 32 of the recess and is so positioned that the locater pin 64 projects through the locater pin aperture 68.

A disk-like inner closure 70, which is advantageously constructed from high strength, transparent, polymeric material, such as Lexan polycarbonate resin, is disposed in the upper end section 28 of the stowage arm 20, with the outer peripheral portion of the inner closure overlying the top surface of the sealing gasket 66. A locater pin recess 72 is disposed in the lower surface of the peripheral portion of the inner closure 70 for receiving the portion of the locater pin 64 that projects upwardly through the locater pin aperture 68 in the sealing gasket 66. An inner closure aperture 74 vertically traverses the inner closure and is disposed in overlying relationship to the valve element aperture 54, of the releasably supported valve element, with the central axis of the inner closure aperture being substantially in longitudinal alignment with the central axis of the valve element aperture. Since the releasably supported valve element is eccentrically disposed in the stowage arm (FIG. 4) the central axis of the valve element aperture 54 is off-center, in the direction of the support member 62, with respect to the central axis of the stowage arm and, in a like manner, the central axis of the inner closure aperture 74 is off-center with respect to the central axis of the inner closure 70. The locater pin 64 cooperates with the locater pin recess 72 in the inner closure to effect superimposed alignment of the off-center inner closure aperture with the valve element aperture in the construction of the valve assembly and in connection with any subsequent removal and refitting of the inner closure to the valve assembly. The lower portion of the inner closure aperture 74 is coaxial with a recess 75 in the underside of the inner closure 70.

An externally threaded tubular compressor 76 is threadedly secured to the vertically disposed, internally threaded upper end section 28 of the stowage arm and compressably biases the inner closure 70 into engagement with the sealing gasket 66. The outer segment 78 of the externally threaded tubular compressor extends beyond the upper end of the stowage arm 20. Diametrically opposed wrench slots 80 are disposed in the upper surface of the tubular compressor to facilitate assembly of the tubular compressor to the stowage arm and removal of the same. A releasable locking device in the form of a set screw 82 threadedly traverses the upper end section 28 of the stowage arm and engages the externally threaded, tubular compressor 76 to thereby maintain the tubular compressor in a releasably fixed position with respect to the stowage arm and the inner closure.

The gastight reset mechanism includes a handle 84, a packing gland assembly 86, a tether 88, and a lift member 90.

As more fully depicted in FIGS. 3 and 13, the packing gland assembly 86 includes a packing gland body 92, a packing gland seal 94 which can be constructed from Teflon stock, a sealing ring 96, a packing gland washer 97, a packing gland jam nut 98, a split-ring washer 99, and a packing gland sealing nut 100. The packing gland body includes a base 102 and an upwardly projecting externally threaded shank 104. The sealing ring 96 is seated in a circumferential groove 106 in the upper surface of the packing gland base 102. The upper portion of the base 102 is matingly disposed in the recess 75 in the lower surface of the inner closure 70 and the packing gland shank 104 projects upwardly through the inner closure aperture 74. The lower portion of the packing gland base projects below the underside of the inner closure 70 and the side wall 108 of this portion of the base is tapered inwardly. A centrally disposed, longitudinal aperture 110 extends through the packing gland body with the upper end portion of this aperture being enlarged to provide a seat 112 for the packing gland seal 94. The packing gland seal is provided with a centrally disposed longitudinal aperture 114 that is in vertical alignment with the aperture 110 of the packing gland body and in substantially longitudinal alignment with the longitudinal axis of the valve element aperture 54 when the valve element is in its releasably supported position. In an alternative embodiment, as shown in FIG. 3A the inner closure 70 and the packing gland body 92 can be provided as an integral unit by molding the same as a single assembly, in which event the groove 106, sealing ring 96, jam nut 98 and washers 97, 99 would not be required.

The tether 88, which is advantageously constructed from spring wire, extends through the valve element aperture 54, through the packing gland body aperture 110 and sealingly and slidably through the aperture 114 of the packing gland seal 94. The upper end section of the tether forms a loop 116 around a segment of the handle 84 which, advantageously, takes the form of a pivotally disposed annular ring, with the loop terminating in a peripheral end section 118 that is coiled around the vertical tether proximate to the loop and disposed in an upper aperture 120 in packing gland nut 100 (FIG. 3). The lower end section of the tether passes through and incorporates a lift member system 122 (FIG. 11) that includes a vertically apertured lift member 90 disposed between and secured in place by a first vertically apertured, swaged retainer bushing 124 and a second vertically apertured, swaged retainer bushing 126, with the lower end of the tether terminating in a loop 128 having a peripheral end extension 130 which is coiled around the vertical tether proximate to the loop and secured in a recess 132 in the underside of the second retainer bushing 126 by appropriately swaging this bushing. The design and dimensions of the lift member are so selected as to enable the lift member to traverse the lower portion 58 of the valve element aperture 54 and engage the tapered abutment 60 formed by the confluence of the upper and lower portions of the valve element aperture. The lift member, which is advantageously in the form of a spheroid, is disposed in the valve housing in spaced relationship to the valve element abutment 60 so as to permit the unimpeded transition of the valve element from its releasably supported position in the stowage arm to its sealing position in the central chamber 18.

An internally threaded, outer closure 134 is threadedly secured to the outer segment 78 of the externally threaded tubular compressor 76. The outer closure is provided with a knurled outer surface 136 to facilitate removal of the closure from the tubular compressor and re-assembly of the same and is further provided with an internal, peripherally disposed sealing gasket 138 which overlies and sealingly engages the top surface 140 of the tubular compressor 76. The shut-off valve of this invention is, preferably, installed in the gas line between the meter and the associated structure and, to provide for level installation, a mineral spirits level 142 is disposed in a recess 144 in the top surface of the outer closure.

From the foregoing, it will be seen that the valve element is a generally elongated structure in the nature of a plumb bob which is suspended in a hollow stowage arm, in the normally open position, by a support member secured to the inner wall of this arm. The hollow arm merges with a downwardly positioned central chamber which is confluent with inlet and outlet fluid conduits, with the central chamber defining a valve receptacle which matingly and sealingly receives the valve element upon dislodgement from the support member and thereby shuts off fluid flow through the chamber.

When the shut-off valve is subjected to a vibratory force from any direction, the valve element inertially spins, or rocks eccentrically, as a small wheel within a large wheel and a whipping action is exerted on the valve head, thereby twisting or disengaging the valve head from its support means. Following displacement from the support means, the valve element drops by gravitation into the central chamber, as shown in FIG. 5.

The valve housing may be one-piece casting of suitable material while the valve element may be made from solid or hollow bar stock.

Reset of the sealingly disposed valve element to its releasably supported position is effected by removing the outer closure 134 from the valve assembly and applying to the handle 84 an upward force followed by a downward force.

The application of an upward force to the handle is transmitted through the tether 88 to the lift member 90 and pulls the lift member through the lower portion 58 of the valve element aperture to liftingly engage the valve element abutment 60. Since the tether is disposed off-center in the direction of the support member 62, the valve element is lifted upwardly along that portion of the inner wall 22 of the stowage arm which underlies the support member whereby the valve head 36 engages and deflects about the support member 62, as shown in FIGS. 6 and 7. Engagement of the valve head with the support member takes place along the inclined side wall 44 of the valve head which permits the valve head to slidingly deflect about the support member. The valve element reaches an upward stop position when the top surface 42 of the valve head 36 engages the underside of the inner closure 70, with the tapered side wall 108 of the lower projection of the packing gland base matingly engaging a substantially corresponding taper 142 in the side wall defining the outer segment of the upper portion 56 of the valve element aperture 54, as shown in FIGS. 3 and 8. At the stop position, the support member is disposed between the valve head 36 and valve body 40 and the valve head is in re-seating alignment with the support member.

The application of downward force to the handle 84 causes the valve element to descend to its releasably supported position with the outer end segment of the support member 62 supportably and releasably engaging the angular recess 50 in the lower surface 46 of the valve head, as shown in FIG. 9. The continued application of downward force to the handle 84 returns the handle to its position proximate to the upper surface of the packing gland nut 100 and causes the lift member 90 to descend to its static position in the housing in spaced relationship to the valve element abutment 60, as shown in FIG. 10. Following reset of the valve element, the outer closure 134 is resecured to the valve assembly.

While in the foregoing description and accompanying drawing there has been shown and described the preferred embodiment of this invention, it will be understood, of course, that minor changes may be made in the details of construction as well as in the combination and arrangement of parts without departing from the spirit and scope of the invention as claimed.

That which is claimed is:

1. A shock-actuated shut-off valve for fluid flow lines which comprises:
   a valve housing having a central chamber in communication with hollow inlet and outlet conduits and with a hollow, outwardly enclosed stowage arm in upward, substantially plumb communication with the central chamber;
   valve element support means secured to the inner wall of said stowage arm, a valve element disposed in said stowage arm, said valve element having a valve head and valve body interconnected by a valve neck, with said valve head being distal to the central chamber and being in engagement with and releasably supported by said support means for maintaining said valve element in a releasably supported position, said releasably supported valve element being in spaced relationship to the inner wall of the stowage arm to provide valve element clearance between said support means and said wall, whereby lateral dislodgment of the valve element from the support means effects transition of the valve element through the stowage arm to the central chamber, with the valve body sealingly engaging said chamber with respect to at least one of the inlet and outlet conduits;
   a vertically disposed valve element aperture extending through said valve element, said valve element aperture incorporating non-occlusive abutment means;

an inner closure disposed in the stowage arm at a locus above the valve element, and means for sealingly securing the periphery of the inner closure about the inner wall of the stowage arm;

a vertically disposed, inner closure aperture extending through said inner closure, said inner closure aperture being in substantially superimposed alignment with said valve element aperture;

a tether extending through said inner closure aperture and through said valve element aperture, said tether being in sealingly slidable relationship with said inner closure aperture and in spaced relationship to said valve element aperture, said tether having an upper end section and lower end section, said upper end section incorporating handle means disposed proximate to the upper surface of the inner closure and said lower end section incorporating lift means disposed in a static position, in said housing, below said abutment means, said lift means being in traversable alignment with said valve element aperture and in spaced relationship to said abutment means to permit transition of said valve element to said central chamber and to permit said lift means to liftingly engage said abutment means;

whereby the application of upward force to said handle means, when said valve element is sealingly disposed in the central chamber, causes said lift means to engage said abutment means and transport said valve element upwardly to a stop position at the underside of said inner closure, with said valve head, during the upward transition of said valve element, engaging and deflecting about said support means to effect seating alignment of said valve head with said support means, and the subsequent application of downward force to said handle means initially causes said valve element to descend to its releasably supported position, with said valve head engaging said support means and thereafter causes said lift means to disengage from said abutment means and descend to its static position.

2. The shut-off valve of claim 1 wherein the valve head of said valve element includes an upper surface, a depending side wall and a lower surface, with said lower surface being in engagement with and releasably supported by said support means.

3. The shut-off valve of claim 2 wherein the depending side wall of the valve head is inclined inwardly from the lower surface to the upper surface and the outer end of the lower surface of the valve head is provided with a circumferential recess for releasably engaging said support means.

4. The shut-off valve of claim 3 wherein the circumferential recess has an angular configuration.

5. The shut-off valve of claim 1 wherein the valve body tapers inwardly in the downward direction and the inner wall of the stowage arm is provided with a substantially corresponding taper.

6. The shut-off valve of claim 1 wherein said valve element aperture comprises an upper portion and a lower portion, with the cross-sectional area of the upper portion being less than the cross-sectional area of the lower portion and the confluence of the upper and lower portions defining said abutment means.

7. The shut-off valve of claim 6 wherein the confluence of the upper portion with the lower portion is beveled outwardly.

8. The shut-off valve of claim 2 wherein the means for sealingly securing the inner closure about the inner wall of the stowage arm at a locus above said valve element includes a vertically disposed, tubular recess in the outer end section of the inner wall, said recess having contiguous shoulder and neck portions, sealing means engaging said shoulder portion, said inner closure engaging said sealing means, and tubular compressor means engaging said inner closure, said tubular compressor means being adjustably and releasably secured to the neck portion of said recess.

9. The shut-off valve of claim 8 wherein said inner closure comprises high strength polymeric material.

10. The shut-off valve of claim 9 wherein said high strength, polymeric, inner closure is substantially transparent.

11. The shut-off valve of claim 9 wherein said high strength polymeric material comprises polycarbonate resin.

12. The shut-off valve of claim 8 wherein the inner closure aperture comprises adjustable sealing means.

13. The shut-off valve of claim 12 wherein said adjustable sealing means comprises a longitudinally apertured, adjustable compression fitting.

14. The shut-off valve of claim 11 wherein said compression fitting comprises a packing gland assembly incorporating a longitudinally apertured, sealingly adjustable packing gland seal.

15. The shut-off valve of claim 8 wherein a vertically disposed locater pin is secured to the shoulder portion of said stowage arm, a locater aperture traverses the sealing means that engages said shoulder portion, a locater pin recess is disposed in the underside of said inner closure, and said locater pin passes through the locater aperture and seats in the locater pin recess to provide horizontal positioning for said inner closure aperture, said tether, and said lift means to thereby provide effective horizontal alignment of the valve element for reset to its releasably supported position, following displacement of the valve element to the central chamber, whereby the side wall of the valve head, during reset, slidingly contacts and deflects about said support means to vertically align the lower surface of the valve head with said support means.

16. The shut-off valve of claim 1 wherein said valve is deployed in a linearly aligned dual valve system in which the angular alignment of the valve element support means in one valve assembly with respect to the valve element support means in the other valve assembly is out of phase from about 45° to about 135°, right or left, based on a hypothetical transition of the location of the support means in one valve assembly to a corresponding location in the other valve assembly.

17. The shut-off valve of claim 16 wherein the angular alignment of the valve element support means in one valve assembly with respect to the valve element support means in the other valve assembly is about 90°.

18. The shut-off valve of claim 17 wherein one of said valve element support means is angularly disposed at about 45° from the longitudinal axis of the linearly aligned dual valve system.

19. A shock actuated shut-off valve system for fluid flow lines including:
a conduit defining a fluid flow path sealed to the ambient and extending between a fluid flow inlet and a fluid flow outflow and enabling a sealed connection between the system and a fluid flow line, valve means having set position above said flow path for closing said conduit to fluid flow by dislodgment from said set position and gravity displacement effectively to block and seal off said fluid flow path, said valve means including dislodgment means responsive to shock forces applied to said system from a plurality of external directions relative thereto, said valve means further including reset means operable from the ambient for resetting said valve means after dislodgment to said set position without breaking the seal of the fluid flow path to the ambient, said reset means comprising tether means attached to valve return means and communicating to the ambient through seal providing means, said tether means and said valve return means for enabling said valve means to be reset to its predislodgment position by application of pulling force applied upon said tether means external to said conduit.

20. The shock actuated shut-off valve system for fluid flow lines as set forth in claim 19 wherein said valve means including dislodgment means responsive to shock forces applied to said system from a plurality of external directions relative thereto comprises a plurality of valves arranged in series along said conduit, each valve means including separate dislodgment means, with the dislodgement means of one of said plurality arranged to be responsive to shock forces applied to said system from one external direction, and with the dislodgement means of another of said plurality arranged to be responsive to shock forces applied to said system from another external direction different than said one external direction.

* * * * *